United States Patent [19]
Iki et al.

[11] 3,940,567
[45] Feb. 24, 1976

[54] MULTIPLEX TRANSMISSION SYSTEM ON-OFF SIGNAL

[75] Inventors: Shinichi Iki, Sagamihara; Hideaki Kosugi, Yokohama, both of Japan

[73] Assignee: Nissan Motor Co., Ltd., Japan

[22] Filed: Nov. 29, 1974

[21] Appl. No.: 528,240

[30] Foreign Application Priority Data
Dec. 5, 1973 Japan.............. 48-135256
Dec. 5, 1973 Japan.............. 48-135257

[52] U.S. Cl. ............................................ 179/15 BY
[51] Int. Cl.² .......................................... H04J 3/12
[58] Field of Search ............................... 179/15 BY

[56] References Cited
UNITED STATES PATENTS
3,060,296  10/1962  Stack.............................. 179/15 By
3,586,781  6/1971  Jones.............................. 179/15 BY
3,757,053  9/1973  Pell................................ 179/15 By

*Primary Examiner*—Ralph D. Blakeslee
*Attorney, Agent, or Firm*—Robert E. Burns; Emmanuel J. Lobato; Bruce L. Adams

[57] ABSTRACT

Control pulses of highest positive level, clock pulses of negative middle level and reset pulses of lowest negative level are transmitted through one or more transmission lines. Separation of those pulses in the receiver is performed by means of simple rectifiers connected to the transmission lines. In both transmitter and receiver, binary counters and decimal decoders are utilized for repeatedly producing channel pulse sequences.

15 Claims, 40 Drawing Figures

MULTIPLEX TRANSMISSION SYSTEM ON-OFF SIGNAL

The present invention relates to a multiplex signal transmission system capable of transmitting and receiving a plurality of signals with a time division mode by using a minimum number of transmission lines.

In industrial machines which are controlled from a remote control station, it is necessary to interconnect a control board in the control station and the machine with signal transmission lines. It has been the practice to provide two transmission lines for each signal. However, with the development of high grade control and increased complexity of control the number of signals is also increased thus requiring a great many signal transmission lines of the order of several hundreds to several thousands. Such large number of transmission lines are not only expensive but requires long period of installation. Further, reliability of the control system is decreased and troublesome maintenance is required. To obviate these difficulties, it has been proposed to transmit the control signals in a multiplex mode. However, prior art multiplex signal transmission systems are extremely complicated and expensive. Moreover, since control signals utilized to control industrial machines etc. are generally of the simple ON-OFF type, it is not economical to use complicated multiplex system to transmit these signals.

Accordingly, it is an object of the present invention to provide an improved multiplex transmission system which requires only one or two transmission lines.

Another object of the present invention is to provide a novel ON-OFF signal multiplex transmission system which is not required to use expensive shielded conductors and further free from influence by noise.

Yet another object of the present invention is to provide a new and improved ON-OFF signal multiplex transmission system capable of standardizing the transmitting and receiving apparatus, thereby decreasing the cost of installation and maintenance.

According to the present invention there is provided a multiplex transmission system comprising transmitting apparatus, receiving apparatus and a transmission circuit interconnecting the transmitting and receiving apparatus. The transmitting apparatus comprises a plurality of control switches, means to generate a clock pulse, a first counting circuit operated in synchronism with the clock pulse for periodically and sequentially detecting the ON-OFF states of respective control switches thereby repeatedly producing a first pulse train corresponding to the ON-OFF states, means for producing a reset pulse for the first counting circuit for resetting the same at each one period, and means for transmitting the first pulse train, the clock pulse and the reset pulse over the transmission circuit.

The receiving apparatus comprises a trigger pulse generator, a plurality of flip-flop circuits for storing and sending out the states of the pulses of the first pulse train received from the transmission circuit at an instant when the trigger pulse is applied to the flip-flop circuits, a second counting circuit operated synchronously with the clock pulse received from the transmission circuit for applying the trigger pulse successively to the flip-flop circuits, means for applying the reset pulse received from the transmission circuit to the second counting circuit for resetting the same at each period and a plurality of output circuits which are controlled in accordance with the outputs from the flip-flop circuits. With this system the ON-OFF states of the control switches in the transmitting apparatus are sent with a time division mode and reproduced on the output circuits of the receiving apparatus.

Where the transmission circuit comprises a single transmission line, the transmitting apparatus is provided with means for combining the first pulse train, the clock pulse and the reset pulse into a second pulse train having four levels and means for transmitting the second pulse train over the single transmission line, and the receiving apparatus is provided with means for decomposing the received second pulse train into the first pulse train, the clock pulse and the reset pulse.

Where the transmission circuit comprises two transmission lines, the transmitting apparatus is provided with means for combining the first pulse train and the clock pulse into a second pulse train with one of the first pulse train and the clock pulse positive and the other negative, means for transmitting the second pulse train over one of the transmission lines, and means for transmitting the reset pulse over the other transmission line, whereas the receiving apparatus is provided with means for decomposing the second pulse train received from the one transmission line into the first pulse train and the clock pulse and a logical converter for converting a negative logic pulse into a positive logic pulse.

The invention can be more fully understood from the following detailed description taken in conjunction with the accompanying drawings in which:

FIGS. 3A-G and 4G-R shown waveformes at various portions of the transmitting and receiving apparatus, respectively, shown in FIGS. 1 and 2;

FIGS. 7A-H and 8G-P show waveforms at various portions of the transmitting and receiving apparatus shown in FIGS. 5 and 6, respectively.

Figure 1:
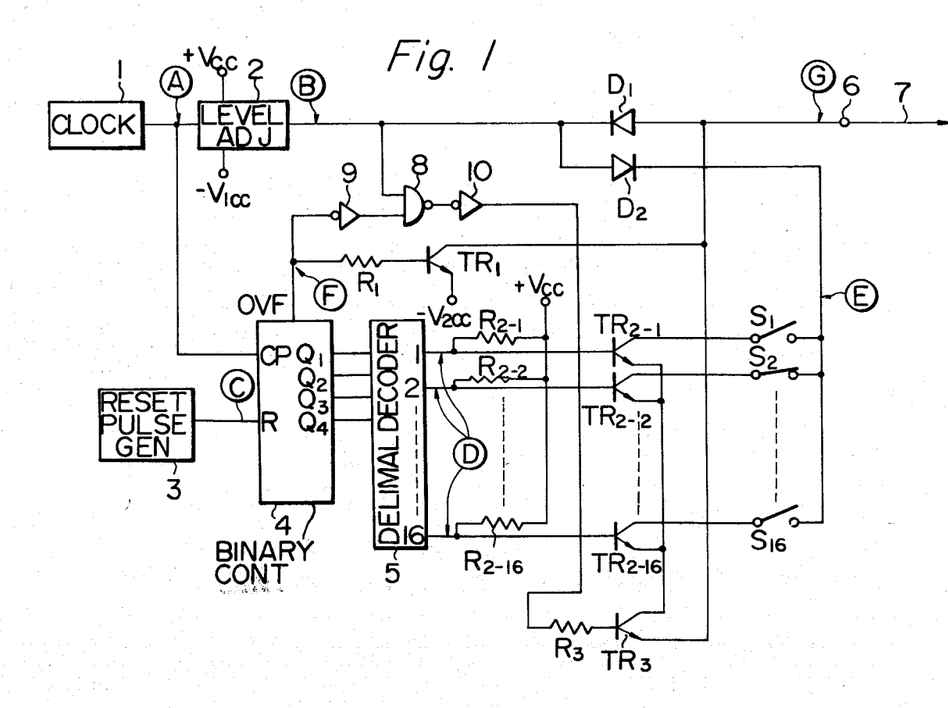
FIG. 1 is a block diagram showing one example of the transmitting apparatus embodying the invention which utilizes a single transmission line.
Figure 2:
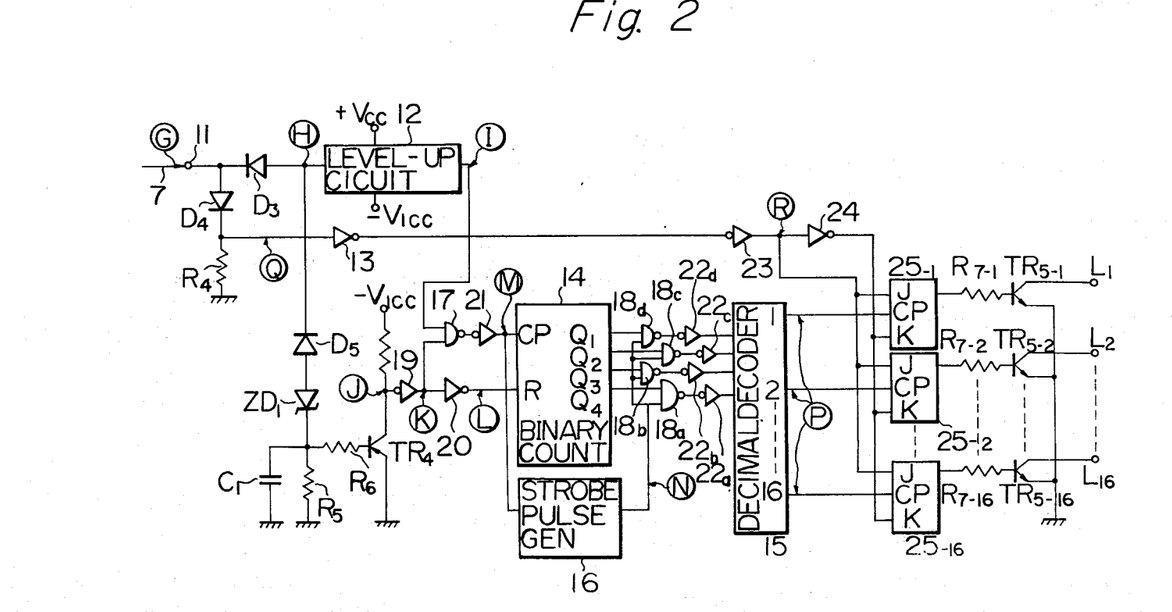
FIG. 2 is a block diagram showing one example of the receiving apparatus embodying the invention.

The transmitter shown in FIG. 1 and the receiver shown in FIG. 2 constitutes one embodiment of this invention wherein a single transmission line is utilized to transmit and receive a plurality of ON-OFF signals.

The transmitter shown in FIG. 1 comprises a clock pulse generator 1 for generating clock pulses, a level adjustor 2 for converting the clock pulse into a pulse having lines of +1 and —1, a binary counter 4 which produces 4 bit binary code pulse, a reset pulse generator 3 for producing only one reset pulse for resetting the binary counter 4 when the transmitter is supplied with electric power, and a decimal decoder 5 for converting the binary outputs from binary counter 4 into decimal code pulse signals. The output of the level adjustor 2 is applied to a transmission line 7 through a diode $D_1$ and an output terminal 6. One input terminal of a NAND gate circuit 8 is connected to the output of level adjustor 2 whereas the other input is connected to the overflow output terminal OVF of the binary counter 4 through an NOT gate circuit 9. The output of the NAND gate circuit 8 is connected to the base electrode of a control transistor $TR_3$ through an NOT gate circuit 10 and a resistor $R_3$. The emitter electrode of transistor $TR_3$ is connected to output terminal 6 while the collector electrode of transistor $TR_3$ is connected to the emitter electrodes of transistors $TR_{2-1}$, $TR_{2-2}$, . . . $TR_{2-16}$. The base electrodes of transistors $TR_{2-1}$, $TR_{2-2}$, . . . $TR_{2-16}$ are connected to output terminals 1, 2, . . . 16 of the decimal decoder 5, respectively and to a source terminal $+V_{cc}$ through resistors $R_{2-1}$, $R_{2-2}$, . . . $R_{2-16}$, respectively. The collector electrodes of transistors $TR_{2-1}$, $TR_{2-2}$, . . . $TR_{2-16}$ are connected to the juncture between the level adjustor 2 and diode $D_1$ via a plurality of control switches $S_1$, $S_2$, . . . $S_{16}$ and a diode $D_2$ having a polarity opposite to that of diode $D_1$. The output terminal OVF of binary counter 4 is also connected to the base electrode of transistor $TR_1$ through a resistor $R_1$. The collector electrode of transistor $TR_1$ is connected to output terminal 6 and the emitter electrode is connected to a source of $-V_{2cc}$.

The receiver shown in FIG. 2 comprises an input terminal 11 connected to the transmission line 7, a level-up circuit 12 connected to the input terminal 11 through a diode $D_3$ and functions to raise the level of the received pulse by $+V_{cc}$. The output from the levelup circuit 12 is applied to a trigger terminal CP of a binary counter 14 via NAND gate circuit 17 and an NOT gate circuit 21. The juncture between diode $D_3$ and level-up circuit 12 is grounded through serially connected diode $D_5$, a Zener diode $ZD_2$ and resistor $R_5$ which is shunted by a noise by-pass capacitor $C_1$. The juncture between the Zener diode $ZD_1$ and resistor $R_5$ is connected to the base electrode of transistor $TR_4$ via resistor $R_6$. The emitter electrode of transistor $TR_4$ is grounded whereas its collector electrode is connected to a source terminal $-V_{1cc}$ via a resistor. This collector electrode is also connected to the reset terminal R of binary counter 14 through serially connected NOT gate circuits 19 and 20, the intermediate point thereof being connected to the other input of the NAND gate circuit 17. The output of the NOT gate circuit 21 is connected to the input terminal of a stroke pulse generator 16 having its output connected to input terminals of NAND gate circuits 18a, 18b, 18c and 18d. The other input terminals of NAND gate circuits 18a, 18b, 18c and 18d are connected to output terminals Q1, Q2, Q3 and Q4 of the binary counter 14 and the output terminals of the NAND gate circuits 18a, 18b, 18c and 18d are connected to input terminals of a decimal decoder 15 via NOT gate circuits 22a, 22b, 22c and 22d, respectively. There are provided a plurality of JK flip-flop circuits 25-1 through 25-16. The J terminals of these flip-flop circuits are connected to the juncture between a diode $D_4$ and a resistor $R_4$ which are connected in series between input terminal 11 and the ground, through an inverter 13 and an NOT gate circuit 23. The CP terminals of flip-flop circuits 25-1 through 25-16 are connected to output terminals 1 through 16, respectively of the decimal decoder 15, whereas the K terminals of the flip-flop circuits are connected to the output of NOT gate circuit 23 through an NOT gate circuit 24. The output terminals of JK flip-flop circuits 25-1 through 25-6 are connected to the base electrodes of transistors $TR_{5-1}$ through $TR_{5-16}$ via resistors $R_{7-1}$ through $R_{7-16}$, respectively. The emitter electrodes of transistors $TR_{5-1}$ through $TR_{5-16}$ are commonly grounded whereas the collector electrodes are connected to output terminals $L_1$, $L_2$, . . . $L_{16}$, respectively.

The operations of the circuits shown in FIGS. 1 and 2 will now be described with reference to waveforms shown in FIGS. 3 and 4 in which A through G show waveforms at portions of FIGS. 1 and 2 designated by the same symbols.

Figures 3, 3A:
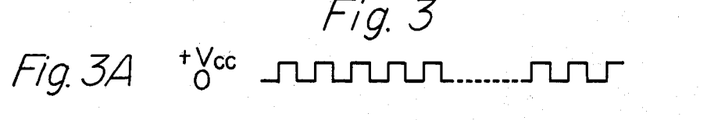
Figure 3B:
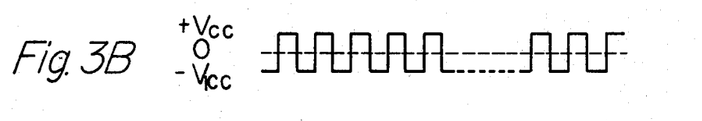
Figure 3C:
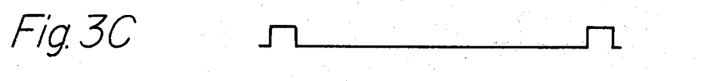

The clock pulse generator 1 generates clock pulses as shown in FIG. 3A which is converted into pulses shown in FIG. 3B and having levels between +1 and −1 by the action of the level adjustor 2. (In FIG. 3B, +1 and −1 are indicated by $+V_{cc}$ and $-V_{cc}$ respectively.) These pulses are also used as the clock pulse for the decimal decoder 4 thereof. The reset circuits 3 produces a reset signal C for this purpose.

Figure 3D:
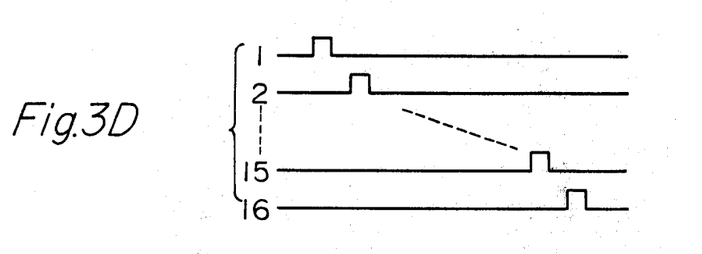

The binary counter 4 is constructed such that it produces 4 bits that is $2^4 = 16$ binary code pulses which are supplied to the decimal decoder 5 through its output terminals $Q_1$ through $Q_4$ and that a positive pulse is produced at its OVF terminal at each one cycle (16 counts). Accordingly, the outputs from the OVF terminal of the binary counter 4 have waveforms as shown by FIG. 3F. The OVF pulses are inverted by the transistor $TR_1$ is applied to the output terminal 6 as a pulse of the negative logic having a level of −2 (in FIG. 3 shown as $-V_{2cc}$).

Upon receiving a binary code from the binary counter 4 the decimal decoder 5 sequentially produces outputs on its terminals 1, 2, - - - 16 at the same repetition period as the clock pulse. These pulses are shown in FIG. 3D and are applied to the base electrodes of transistors $TR_{2-1}$ through $TR_{2-16}$, respectively.

Figure 3E:
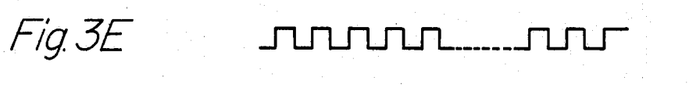
Figure 3F:
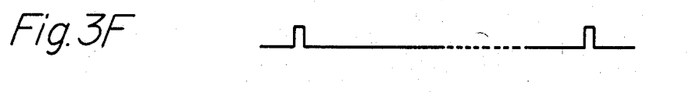
Figure 3G:
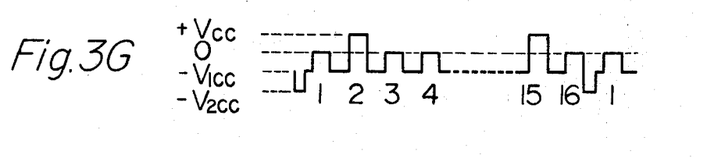

The output pulses from the level adjustor 2 are converter into positive pulses shown in FIG. 3E by the operation of diode $D_2$ and the positive pulses are impressed upon the collector electrodes of transistors $TR_{2-1}$ through $TR_{2-16}$ respectively through control switches $S_1$ through $S_{16}$. Accordingly, among these transistors those having collector electrodes which are supplied with the pulse of FIG. 3E when pulse of FIG. 3D are impressed upon their base electrodes become conductive. In other words, among transistors $TR_{2-1}$ through $TR_{2-16}$ those associated with control switches which are closed will become conductive whereas those associated with control switches which are open will not become conductive. As a result, a pulse train corresponding to the opened and closed states of control switches $S_1$ through $S_{16}$ is impressed upon the collector electrode of transistor $TR_3$. Since the base electrode of transistor $TR_3$ is supplied with a signal corresponding to the logical product of the inverted signal of pulses of FIG. 3F and pulses of FIG. 3B, the transistor $TR_3$ is rendered ON only when pulses of FIG. 3F are at a low negative level, that is, there is no reset signal and pulse of FIG. 3B is at a high level. Accordingly, channel pulses according to the opened and closed conditions of the control switches $S_1$ through $S_{16}$ are sent to the output terminal 6 in synchronism with the pulses of FIG. 3B. In FIG. 3G, pulses on transmission line is illustrated when two control switches $S_2$ and $S_{15}$ are closed.

The negative pulse of FIG. 3B is supplied to the output terminal 6 through diode $D_1$ having a polarity opposite to that of diode $D_1$. Accordingly, as shown in FIG. 3G, the pulse sent out to the transmission line 7 from the output terminal 6 is a pulse train consisting of positive channel pulses, negative pulses of a −1 level, and negative reset pulses of a −2 level sent from transistor $TR_1$.

Figure 4G:
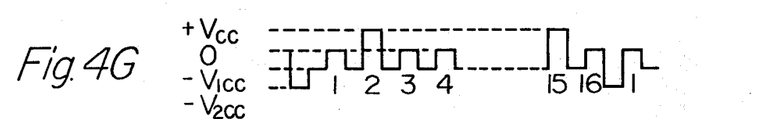
Figure 4H:
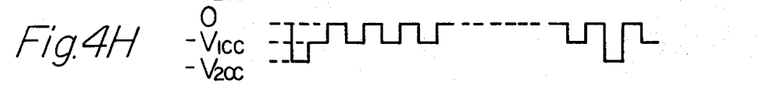

The receiver shown in FIG. 2 operates as follows. The pulses of FIG. 3G are applied to the input terminal 11, and are decomposed into negative pulses shown in FIG. 4H and positive pulses as shown in FIG. 4P by the action of diodes $D_3$ and $D_4$. Thus, the diodes $D_3$ and $D_4$ constitutes a separator. The negative pulses are applied to Zener diode $ZD_1$ through diode $D_5$ for blocking positive voltage. It is assumed now that the Zener voltage $V_{ZD}$ of the Zener diode $ZD_1$ is set to be expressed by an equation $V_{1cc} < V_{ZD} < V_{2cc}$. Then when the crest value of the negative pulse of FIG. 4H is equal to $-V_{1cc}$, the base potential of transistor $TR_4$ becomes equal to the ground potential so that this transistor will not become conductive. On the other hand, when the crest value of the negative pulse of FIG. 4H is equal to $-V_{2cc}$, the base potential of transistor $TR_4$ becomes equal to $-V_{2cc} + V_{ZD}$, with the result that the collector potential of transistor $TR_4$ will become equal to the output F at the reset pulse of the binary counter 4 is produced.

Figure 4I:
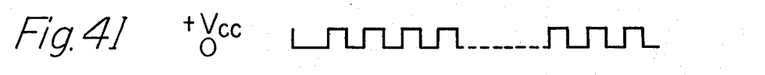
Figure 4J:
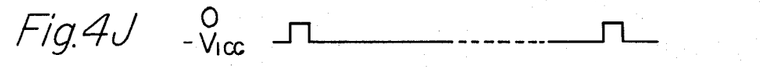
Figure 4K:
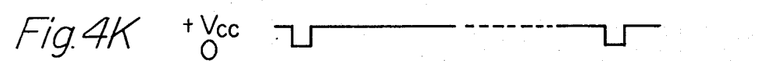
Figure 4L:
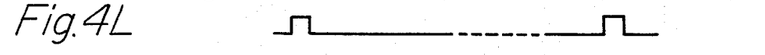
Figure 4M:
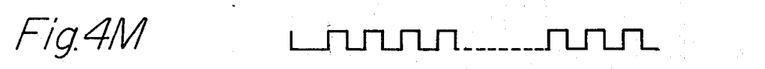

The negative pulses of FIG. 4H are also supplied to the level-up circuit 12 and converted into positive pulses having two levels of 0 and $+1V_{cc}$ as shown in FIG. 4I. Positive pulses of FIG. 4M corresponding to the logical product of pulses at a point K inverted from pulses at a point J and pulses at a point I is used as the clock pulses for binary counter 14. The positive pulse at a point M is also applied to the strobe pulse generator 16.

Figure 4N:
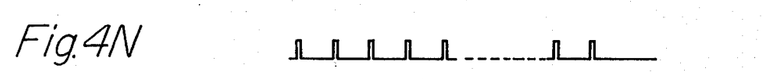
Figure 4P:
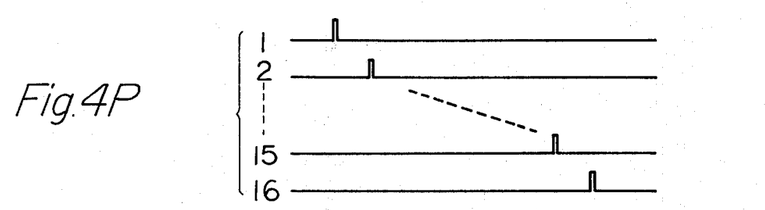
Figure 4Q:
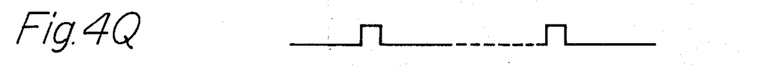

The strobe pulse generator comprises a circuit including a delay element which operates at the buildup portion of the positive pulse at M applied thereto, and a circuit connected in series therewith and operates to differentiate the output thereof, thereby producing strobe pulses at a point N having a narrow pulse width and becoming positive at points slightly later than the points at which the pulse at the point E becomes the high level as shown in FIG. 4N. The logical product of the strobe pulses at the point N and the output pulses at the output terminal Q1 through Q4 of the binary counter 14 are applied to the decimal decoder 15. Consequently, the output from the decimal decoder 15 appears at points P all having the same pulse width as the strobe pulse N as shown in FIG. 4P. These pulses are applied to the trigger gates CP of respective JK flip-flop circuits 25-1 through 25-16.

Figure 4R:
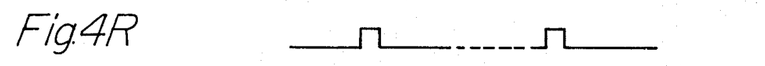

The positive pulses at a point Q are applied to the J terminals of respective JK flip-flop circuits 25-1 through 25-16 via inverter 13 and NOT gate circuit 23. Pulses at a point R shown in FIG. 4R represents pulses which correspond to pulses which are formed in accordance with the opened and closed states of the control switches $S_1$ through $S_{16}$ in the transmitter. Pulses inverted from the pulses at the point R by the NOT gate circuit 24 are applied to the K terminals of respective JK flip-flop circuits 25-1 through 25-16.

As a consequence, each one of the JK flip-flop circuits stores the pulses at R at the time when it receives the trigger pulse at P from the decimal counter 15 and produces the stored condition as an output. These outputs are applied to the base electrodes of respective transistors $TR_{5-1}$ through $TR_{5-16}$. Thus, by connecting controlled apparatus to the collector electrodes of these transistors through output terminals $L_1$ through $L_{16}$ it becomes possible to control the controlled apparatus in accordance with the opening and closing of the control switches $S_1$ through $S_{16}$ in the transmitter shown in FIG. 1.

Reset pulses at L inverted from pulses at K by the NOT gate circuit 20 are applied to the reset terminal R of the binary counter 14. In other words the binary counter 14 is reset at each one cycle (16 counts) in synchronism with the binary counter shown in FIG. 1. In this manner, both binary counters 4 and 14 are forcibly brought into synchronism at each one cycle, so that there is no fear of accumulation of the difference in the counts of both counters.

Furthermore, as has been described hereinabove, as the JK flip-flop circuits are triggered by the strobe pulses having a narrow pulse width it is possible to prevent misoperation of these JK flip-flop circuits caused by noises.

Where, the controlled apparatus are connected to the output terminals $L_1$ through $L_{16}$ through relays or other intervening apparatus instead of directly connecting controlled apparatus to the output terminals, it is possible to assure correct operation thereof even when the JK flip-flop circuits are caused to misoperate by noises by selecting the response time of such relays or the like to be longer than the repetition period (the interval of said one cycle consisting of 16 counts) of the decimal decoder 15. Thus, for example, where the oscillation frequency of the clock pulse oscillator 1 is selected to be equal to 10 KH$_z$, the repetition period of the decimal counter 16 would be equal to 1.6 ms so that respective JK flip-flop circuits continuously produce outputs of 1.6 ms ($= 0.1$ ms $\times$ 16) of the same value. Assuming now that the relays connected to output terminals $L_1$ through $L_{16}$ respectively require an operating time of 6 ms, the relay would not be operated unless the JK flip-flop circuits produce outputs of the same value at least four times ($1.6 \times 4 = 6.4 > 6$ ms). In other words, only when JK flip-flop circuits produce outputs of the same value for four cycles relay are operated. For this reason, even when the JK flip-flop circuits are caused to misoperate by noises, such misoperation will not affect the correct operation of the controlled apparatus.

According to the embodiment described above it is possible to transmit and receive a plurality of ON-OFF signals by utilizing a single transmission line with time division mode by transmitting clock pulses, control pulses and reset pulses over the transmission line.

While in the foregoing embodiment 16 types of ON-OFF signals were used, it should be understood that the types of the signals may be larger or smaller than 16. Further, instead of utilizing the positive portion of the pulse transmitted over the transmission line as the control signal and the negative portion as the counting and synchronizing signals, it is also possible to use the positive portion as the control signal and the negative portion as the clock and reset pulses. Thus, the invention not only enables multiplex transmission of a plurality of ON-OFF signals but also greatly decreases the number of transmission lines between the controlling apparatus and controlled apparatus. This not only decreases cost of installation but also makes easy maintenance and inspection. Since the signal flowing through the transmission line is a small pulse signal and since the apparatus is constructed not to be affected by noise it is possible to use not shielded fine conductor as the transmission line, thus decreasing the cost of construction. It is also possible to standardize the transmitter and receiver thereby making it possible to simplify the manufacturing facilities. Where multi-contact type relays are used on the receiving side, it is possible to simplify the control panel. By observing the waveform of the pulse transmitted over the transmission line by means of a synchroscope or the like it is possible to judge the operating condition of the control system thus making it possible to supervise at a remote position the load condition of the entire system.

Figure 5:
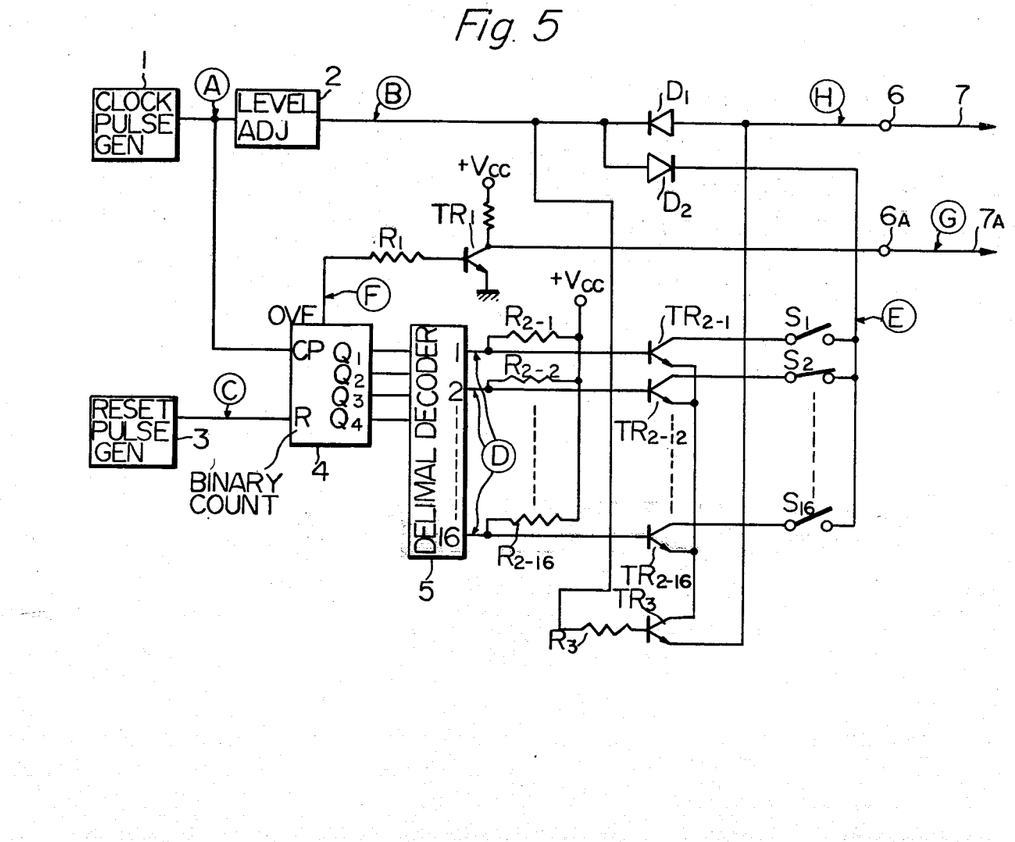
FIGS. 5 and 6 are block diagrams showing the transmitting and receiving apparatus of a modified embodiment of this invention utilizing two transmission lines.
Figure 6:
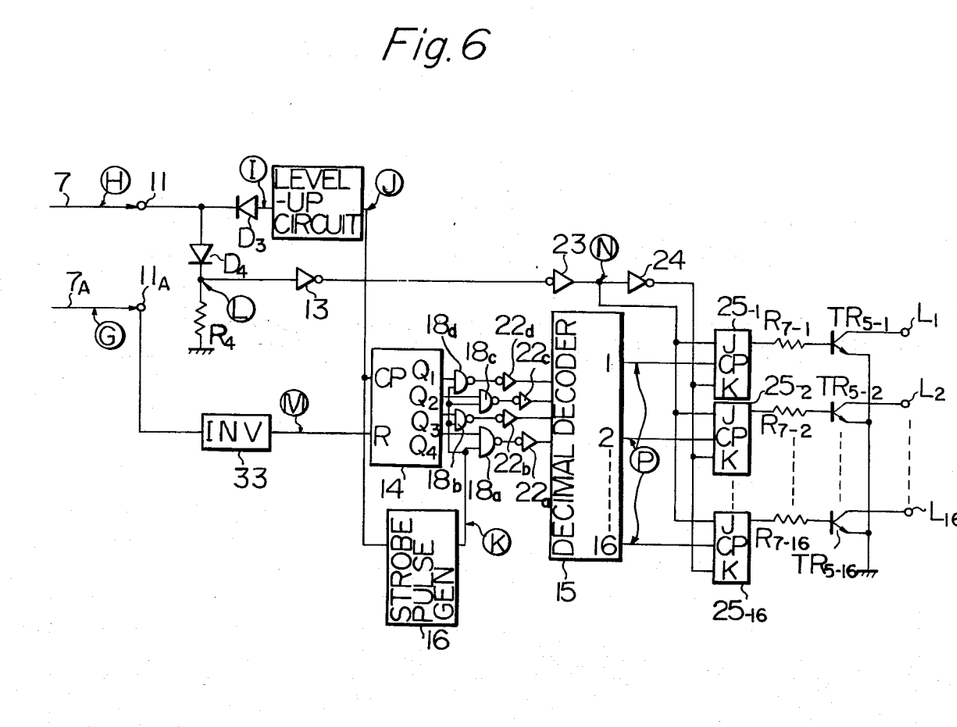

FIGS. 5 and 6 show the transmitter and receiver of a modified multiplex system utilizing two transmission lines 7 and 7A. The construction of the transmitter shown in FIG. 5 is a similar to that shown in FIG. 1 except that a circuit including NOT gate circuits 9 and 10 and NAND gate circuit 8 is omitted, that the base electrode of transistor $TR_3$ is connected to the output of level adjustor 2 through resistor $R_3$ and the collector electrode of transistor $TR_1$ is connected to the second transmission line 7A.

In the receiver shown in FIG. 6, the arrangement of binary counters 14, decimal counter 15, strobe pulse generator 16, JK flip-flop circuits 25-1 through 25-16, transistors $TR_{5-1}$ through $TR_{5-16}$, output terminals $L_1$ through $L_{16}$ and the connections to the J and K terminals of the flip-flop circuits from input terminal 11 are identical to those shown in FIG. 2. However, connections to the CP and R terminals of the binary counter 14 are modified in the following manner. Thus, the output from the level-up circuit 12 is directly connected to the CP terminal of the binary counter 14 and a logical converter 33 for converting a negative logic pulse into a positive logic pulse is connected between the reset terminal R of the ring counter 14 and an input terminal 11A of the second transmission line 7A.

Figure 7A:
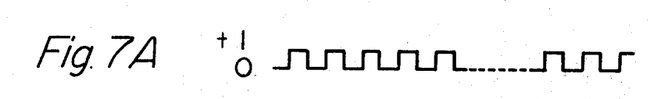
Figure 7B:
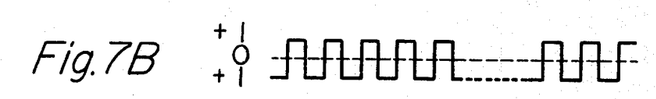
Figure 7C:
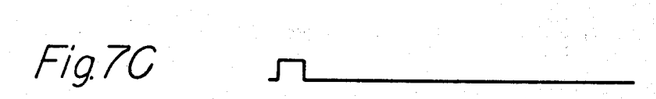

The operation of this modified embodiment will now be described with reference to FIGS. 7A-7H and 8G-8P. In the transmitter shown in FIG. 5, the clock pulse generator 1 generates clock pulses having such waveforms as shown in FIG. 7A and the clock pulses are converted by the level adjustor 2 into pulses at a point B having levels of +1 and −1 as shown in FIG. 7B level adjustor 2. The clock pulses are also applied to the binary counter 4. It is necessary to reset to zero binary counter 4 at the time of energizing the system. Reset circuit 3 is used to supply a reset pulse at C for this purpose. When reset in this manner, the binary counter 4 produces a positive pulse at a point F on its CO terminal, as shown in FIG. 7F.

Figure 7D:
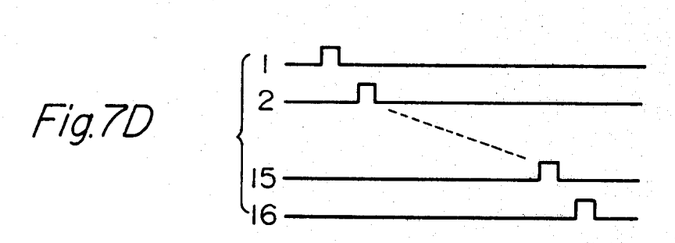
Figures 7E, 7F, 7G:
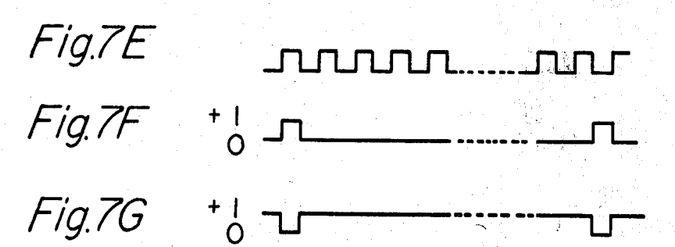

The binary counter 4 is constructed to produce 4 bits or $2^4 = 16$ binary codes which are supplied to the decimal decoder 5, and to produce the positive pulse on its output terminal OVF at each one cycle (or 16 counts), as shown in FIG. 7F. The polarity of the pulses of FIG. 7F are inverted by transistor $TR_1$ to produce negative logic pulse at G which is transmitted over the second transmission line 7A. The purpose of converting the pulse into the negative logic pulse for transmission over the transmission line 7A is to prevent mistransmission of the signal.

Upon receiving the binary codes from the binary counter 4, the decimal decoder 5 successively produces pulses on its output terminals 1 through 16 in synchronism with the period of the clock pulses, as shown in FIG. 7D. These output pulses are applied to the base electrodes of transistors $TR_{2-1}$ through $TR_{2-16}$ in the same manner as in FIG. 1.

Figure 7H:
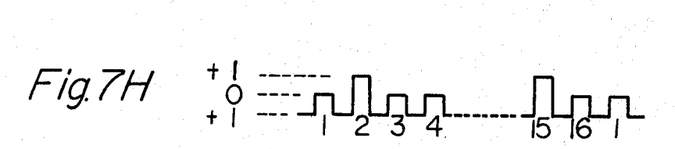

The output pulses at B from the level adjustor 2 are converted into positive pulses as shown in FIG. 7E by the action of diode $D_2$ and the positive pulses at E are impressed upon the collector electrodes of transistors $TR_{2-1}$ through $TR_{2-16}$ through control switches $S_1$ through $S_{16}$, respectively. Accordingly, among these transistors those which are supplied with the pulses of FIG. 3E upon their collector electrodes become conductive when one of pulses at D are applied to their cathode electrodes. In other words, among transistors $TR_{2-1}$ through $TR_{2-16}$, those having associated control switches closed will become conductive but those having associated control switches opened will be held nonconductive. As a consequence, to the collector electrode of transistor $TR_3$ is applied a pulse train corresponding to the opened and closed states of the control switches $S_1$ through $S_6$. Since pulses at B from the level adjustor 2 are impressed upon the base electrode of transistor $TR_3$, this transistor will become conductive only when the pulse at B are positive. As a consequence, a pulse train (hereinafter termed a control signal) corresponding to the opened and closed states of the control switches is sent over the first transmission line 7 through output terminal 6. FIG. 7H shows the waveform when two control switches $S_2$ and $S_{15}$ are closed.

To the output terminal 6 is also applied the negative pulse of the pulses at B through diode $D_1$. As a consequence, the pulse train sent over the transmission line 7 consists of a control signal of a positive pulse and a negative pulse for counting, as shown in FIG. 3H.

Figure 8G:
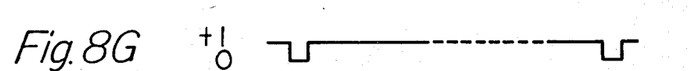
Figure 8H:
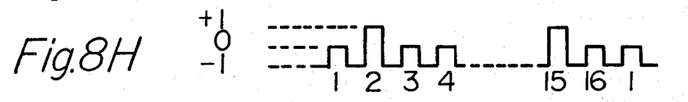
Figure 8I:
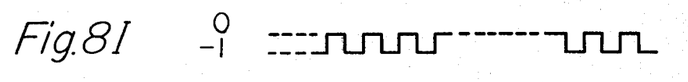
Figure 8J:
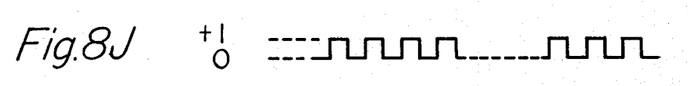

The operation of the receiver shown in FIG. 6 will be described hereunder with reference to FIGS. 8G-8P. Signals at H and G transmitted over the transmission lines 7 and 7A are received as input terminals 11 and 11A, respectively. The pulses at H received at the input terminal 11 is decomposed into such negative pulses as shown in FIG. 8I and such positive pulses as shown in FIG. 8L by the action of diodes $D_3$ and $D_4$. The level of the negative pulses at I is raised by the level-up circuit 12 thus forming such positive pulses as shown in FIG. 8J which are supplied to the binary counter 14 to act as trigger pulses and to the strobe pulse generator 16.

Figure 8K:
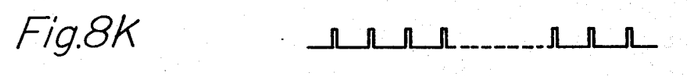
Figure 8L:
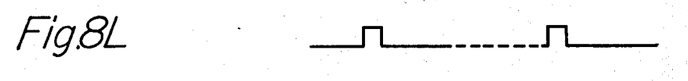
Figure 8M:
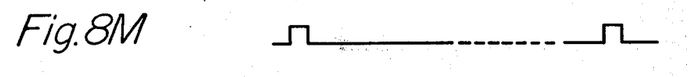
Figure 8N:
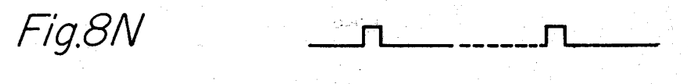
Figure 8P:
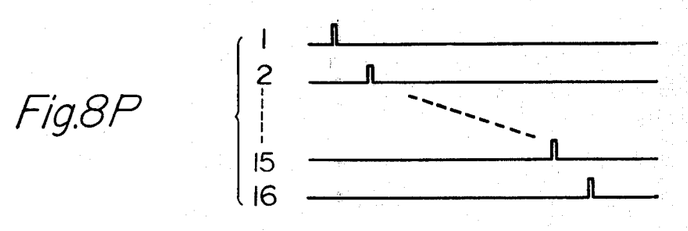

The strobe pulse generator 16 has the same construction as that shown in FIG. 2 and produces strobe pulses at K having a narrow pulse width as shown in FIG. 8K. Again, a logical product of the strobe pulses and the outputs of the binary counter 14 are made by AND gate circuits and applied to the decimal decoder 15. Accordingly, the outputs from the decimal decoder 15 are pulses having the same pulse width as the strobe pulse. The output pulses at P shown in FIG. 8P are applied to the trigger gates CP of respective JK flip-flop circuits 25-1 through 25-16.

The positive pulses at L are applied to the J terminals of respective flip-flop circuits through inverter 13 and NOT gate circuit 20. The pusles at N correspond to the opened and closed states of the control switches $S_1$ through $S_{16}$ in the transmitter shown in FIG. 5. The pulses at N are inverted by the NOT gate circuit 24 and then applied to the K terminals of the JK flip-flop circuits 25-1 through 25-16, whereby these flip-flop circuits store the pulses at N at an instant when the channel pulses P are applied thereto from the decimal decoder 15. The outputs from the JK flip-flop circuits are applied to the base electrodes of respective transistors $TR_{5-1}$ through $TR_{5-16}$ thus turning them ON. Thus, the controlled apparatus, not shown, connected to the collector electrodes of respective transistors $TR_{5-1}$ through $TR_{5-16}$ are controlled in accordance with the opened and closed state of the control switches $S_1$ through $S_{16}$ in the transmitting apparatus.

The pulses at G received at the input terminal 11A is converted into positive logic pulses at M by the logical converter 33, and the pulses at M is applied to the reset terminal of the binary counter 14. As a consequence, the binary counter 14 is reset at each one cycle (16 counts) in synchronism with the binary counter 4 shown in FIG. 5. In this manner, as both binary counters 4 and 14 in the transmitter and receiver are forcibly synchronized at each one cycle there is no fear of accumulating the difference in the counts of both binary counters. Thus only when JK flip-flop circuits produce outputs of the same value during four cycles, the relays, not shown, are operated. Accordingly, even when the JK flip-flop circuits are caused to misoperate by noise, or the like, no output will be provided for the controlled apparatus.

It will be clear that according to this modified embodiment the clock pulses and the control pulses are transmitted over one transmission line and the reset or synchronizing pulses are transmitted over the other transmission line. This modification has the same advantages as the first embodiment except that it utilizes two transmission lines. Accordingly, this modification can be advantageously applied where the distance between the transmitting apparatus and the receiving apparatus is relatively short.

While the invention has been shown described in connection with two preferred embodiments, it should be understood that many changes and modifications may be made without departing from the true spirit and scope of the invention as defined in the appended claims.

What is claimed is:

1. A multiplex transmission system for transmitting a plurality of ON-OFF signals respectively corresponding to a plurality of channels through at least one transmission line, which comprises:
a transmitter including a clock pulse generator for generating clock pulses, a first level adjuster connected to said clock pulse generator for adjusting the top level of said clock pulses at a positive or negative level and the bottom level at a negative or positive middle level, first pulse sequence generator having the same number of output lines as the channels, for repeatedly producing pulse sequences in accordance with said clock pulses, each pulse sequence consisting of the same number of channel pulses respectively appearing on said output lines in synchronizm with said clock pulses, said first pulse sequence generator producing reset pulses each appearing at a leading position of each pulse sequence and each having an utmost negative or positive level of amplitude and applying said reset pulses to said transmission line, first gate means for passing therethrough the negative or positive component of the level-adjusted clock pulses to said transmission line, and a first gate circuit connected to said output lines, for passing therethrough the positive or negative component of the level-adjusted clock pulses to said transmission line in accordance with said channel pulses and said ON-OFF signals; and
a receiver including a separator for separating from each other negative and positive pulse signals on said transmission line, a reset pulse separator for separating said reset pulses from said negative pulse signal, a second level-up circuit connected to said separator for adjusting the top level of said negative pulse signal at said utmost positive or negative level second pulse sequence generator having the same number of output lines as the channels, for repeatedly producing the same pulse sequences as said pulse sequence in accordance with the separated reset pulses and the level-adjusted negative or positive pulse signal, the channel pulses respectively appearing on said output lines of said second pulses sequence generator, a plurality of second gate circuits connected to said output lines of said second pulse sequence generator, each for passing therethrough the separated positive or negative pulse signal when it is triggered by one of said channel pulses.

2. A multiplex transmission system as set forth in claim 1, in which said first pulse sequence generator includes a binary counter of a capacity of the same number as the number of said channels, said binary counter producing an overflow pulse when it overflows, a decimal decoder having the input terminals thereof connected to the output terminals of said binary counter and the output terminals thereof connected to said output lines, for producing one pulse on one of said output terminals in accordance with input signals applied thereto from said binary counter.

3. A multiplex transmission system as set forth in claim 1, in which said first gate means includes a rectifier having the cathode terminal thereof connected to the output of said level adjuster and the anode terminal thereof connected to said transmission line.

4. A multiplex transmission system as set forth in claim 2, in which said first gate circuit includes a plurality of gate transistors each having the base terminal thereof connected to one of said output lines of said decimal decoder, a plurality of control switches each having one terminal thereof connected to the collector of one of said gate transistors, a rectifier having the cathode terminal thereof connected to all of the remaining terminals of said control switches and the anode terminal thereof connected to the output terminal of said level adjuster, a control transistor having the collector connected to all of the emitters of said gate transistors and having the emitter thereof connected to said transmission line, and an AND circuit having one input terminal thereof connected to said outpu terminal of said level adjuster and the other input terminal thereof connected to said overflow terminal of said binary counter, the output terminal of said AND gate being connected to the base of said control transistor.

5. A mutiplex transmission system as set forth in claim 1, in which said separator includes a first rectifier having the cathode terminal thereof connected to said transmission line, and a second rectifier having the anode terminal thereof connected to said transmission line, and a resistor grounding therethrough the cathode terminal of said second rectifier.

6. A multiplex transmission system as set forth in claim 5, in which said reset pulse separator includes a third rectifier having the cathode terminal thereof connected to the anode terminal of said first rectifier, a zenor diode having the anode terminal thereof connected to the anode terminal of said third rectifier, and a gate circuit having the input terminal thereof connected to the cathode terminal of said zenor diode.

7. A multiplex transmission system as set forth in claim 6, in which said second pulse sequence generator includes an AND circuit having one input terminal thereof connected to the output of said level adjuster and the other input terminal thereof connected to the output of said gate circuit, a binary counter having the trigger terminal thereof connected to the output of said AND circuit and the reset terminal connected to the output of said gate circuit, a strobe pulse generator for generating strobe pulses in accordance with the output signal from said AND circuit, a plurality of AND gates respectively connected to the output terminals of said binary counter for passing therethrough output signals from said binary counter when it is triggered by said strobe pulses, and a decimal decoder having the input terminals thereof respectively connected to the output terminals of said AND gates and the output terminals thereof connected to said output lines, for producing decimal code pulses on said output terminals in accordance with input signals applied thereto from said AND gates.

8. A multiplex transmission system as set forth in claim 1, in which said second gate circuits includes a plurality of memory circuits for memorizing therein said separated positive pulse signal when triggered by said one of the channel pulses, and a plurality of output gate circuits connected to said memory circuits for producing output pulse signals in response to the memorized positive pulse signal.

9. A multiplex transmission system for transmitting a plurality of ON-OFF signals respectively corresponding to a plurality of channels through at least two transmission lines, which comprises:
a transmitter including a clock pulse generator for generating clock pulses, a level adjuster connected to said clock pulse generator for adjusting the top level of said clock pulses at a positive or negative level and the bottom level at a negative or positive level, first pulse sequence generator having the same number of output lines as the channels, for repeatedly producing pulse sequences in accordance with said clock pulses, each pulse sequence consisting of the same number of channel pulses respectively appearing on said output lines in synchronism with said clock pulses, said first pulse sequence generator producing reset pulses each appearing at a leading position of each first pulse sequence and applying said reset pulses to one of said transmission lines, first gate means for passing therethrough the negative or positive component of the level-adjusted clock pulses to the other transmission line, and a first gate means for passing therethrough the positive or negative component of the level-adjusted clock pulses to said the other transmission line in accordance with said ON-OFF signals; and
a receiver including a separator for separating from each other negative and positive pulse signals on said one transmission line, a second level-up circuit connected to said separator for adjusting the top level of said signal at said positive or negative level, second pulse sequence generator having the same number of output lines as the channels, for repeatedly producing the same pulse sequences as said pulse sequence in accordance with said reset pulses from said one transmission line and the level-adjusted negative or positive pulse signal, the channel pulses respectively appearing on said output lines of said second pulse sequence generator, a plurality of second gate circuits connected to said output lines of said second pulse sequence generator, each for passing therethrough the separated positive or negative pulse signal when it is triggered by one of said channel pulses.

10. A multiplex transmission system as set forth in claim 9, in which said first pulse sequence generator includes a binary counter of a capacity of the same number as the number of said channels, said binary counter producing an overflow pulse when it overflows, a decimal decoder having the input terminals thereof connected to the output terminals of said binary counter and the output terminals thereof connected to said output lines, for producing one pulse on one of said output terminals in accordance with input signals applied thereto from said binary counter.

11. A multiplex transmission system as set forth in claim 9, in which said first gate means includes a rectifier having the cathode terminal thereof connected to the output of said level adjuster and the anode terminal thereof connected to said the other transmission line.

12. A multiplex transmission system as set forth in claim 10, in which said first gate circuit includes a plurality of gate transistors each having the base terminal thereof connected to one of said output lines of said decimal decoder, a plurality of control switches each having one terminal thereof connected to the collector of one of said gate transistors, a rectifier having the cathode terminal thereof connected to all of the remaining terminals of said control switches and the anode terminal thereof connected to the output terminals of said level adjuster, a control transistor having the collector connected to all of the emitters of said gate transistors and having the emitter thereof connected to said the other transmission line and the base thereof connected to the output terminal of said level adjuster.

13. A multiplex transmission system as set forth in claim 9, in which said separator includes a first rectifier having the cathode terminal thereof connected to said the other transmission line and a second rectifier having the anode terminal thereof connected to said the other transmission line, and a resistor grounding therethrough the cathode terminal of said second rectifier.

14. A multiplex transmission system as set forth in claim 9, in which said second pulse sequence generator includes a binary counter having the trigger terminal thereof connected to the output terminal of said level adjuster and reset terminal thereof connected to said one transmission line, a strobe pulse generator for generating strobe pulses in response to the output signal from said level adjuster, a plurality of AND gates respectively connected to the output terminals of said binary counter for passing therethrough output signals from said binary counter when it is triggered by said strobe pulses, and a decimal decoder having the input terminals thereof respectively connected to the output terminals of said AND gates and the output terminals thereof respectively connected to said output lines, for producing decimal code pulses on said output terminals in accordance with input signals applied thereto from said AND gates.

15. A multiplex transmission system as set forth in claim 9, in which said second gate circuits includes a plurality of memory circuits for memorizing therein the separated positive pulse signal when triggered by said one of the channel pulses, and a plurality of output gate circuit connected to said memory circuits for producing output pulse signals in response to the memorized positive pulse signal.

\* \* \* \* \*